S. R. ROOD.
Earth-Augers.

No. 154,568. Patented Sept. 1, 1874.

Witnesses
John Lewis
C. H. Pierce

Inventor
Samuel R. Rood

UNITED STATES PATENT OFFICE.

SAMUEL R. ROOD, OF MARQUETTE COUNTY, WISCONSIN.

IMPROVEMENT IN EARTH-AUGERS.

Specification forming part of Letters Patent No. 154,568, dated September 1, 1874; application filed February 19, 1874.

*To all whom it may concern:*

Be it known that I, SAMUEL R. ROOD, in the county of Marquette and State of Wisconsin, have invented a new and useful Improvement on a Well-Boring Auger; and I do hereby declare that the following is a full, clear, and exact description of the construction and operation of the same.

Figure 1:
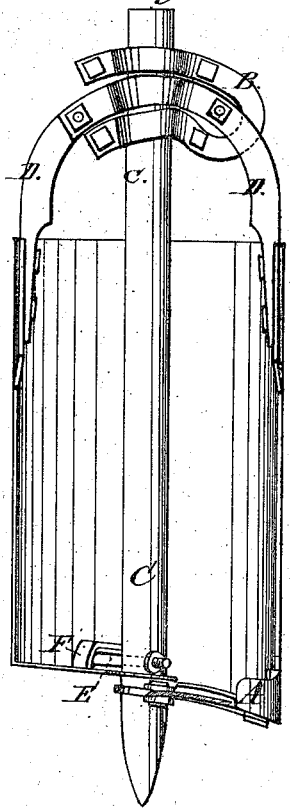
Figure 2:
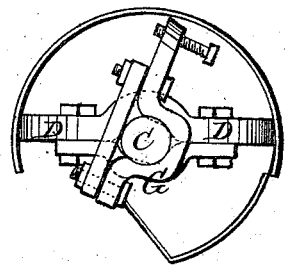

The auger is constructed with an adjustable extension lip or cutter, A, Figure 1, which will cut or bore a hole of sufficient size for tubing or piping to follow through clay or hard-pan, and is driven by means of a second bail, B, attached to the center-rod C, which swings against the original auger-bail D and forces the turning. The lip or cutter is journaled to the auger, near the outside circle, by a bolt, E, Fig. 2, through the bottom of the auger, and attached to the center-rod by means of a stirrup, F, on the inside of the lip or cutter. The extension of the lip or cutter is governed by a set-screw in the second bail.

Figure 3:
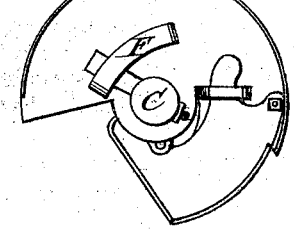
Figure 4:
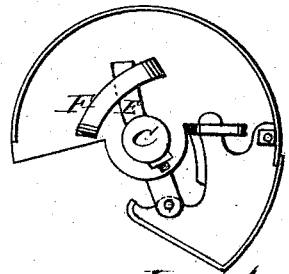

The lip or cutter, when working, is extended beyond and outside of the true circle of the auger, and held there by means of stirrup F, Fig. 4. When filled and ready to raise, give the auger a half-turn back; then the lip or cutter is drawn inside the true circle and held there by means of stirrup F, Fig. 3.

I am aware of the patent to G. M. Filstead, dated March 3, 1874, No. 148,199. His patent is defective, in the fact that it is not practically operative. His adjustable lip has to traverse such an extent over the barrel or casing that it is liable to choke with the dirt, &c., and be rendered useless. I have discovered that, by a much less movement of the lip, I can sufficiently grasp the dirt to allow of its being raised out of the hole, which is the object sought to be attained. I do not claim what is obtained in the above patent, therefore; but

What I claim as my invention, and desire to secure Letters Patent on, is—

The combination of the adjustable extension lip or cutter A, bail B, center-rod C, bail D, and stirrup F, as shown and specified.

SAMUEL R. ROOD.

Witnesses:
JOHN LEWIS,
H. PIERCE.